US008543496B2

(12) United States Patent
Beenau et al.

(10) Patent No.: US 8,543,496 B2
(45) Date of Patent: Sep. 24, 2013

(54) USER EXPERIENCE ON MOBILE PHONE

(75) Inventors: Blayn W. Beenau, Peoria, AZ (US); Jessica U. Jones, Hurstpierpoint (GB); Lee J. Peart, Epsom (GB); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 0 days.

(21) Appl. No.: 11/741,268

(22) Filed: Apr. 27, 2007

(65) Prior Publication Data

US 2008/0270302 A1  Oct. 30, 2008

(51) Int. Cl.
*G06Q 40/00* (2012.01)

(52) U.S. Cl.
USPC .......................................................... 705/39

(58) Field of Classification Search
USPC ................................. 705/39, 35–45; 235/380
See application file for complete search history.

(56) References Cited

U.S. PATENT DOCUMENTS

| | | | |
|---|---|---|---|
| 5,796,832 A | 8/1998 | Kawan | 380/24 |
| 5,949,044 A | 9/1999 | Walker et al. | 235/379 |
| 5,991,749 A | 11/1999 | Morrill, Jr. | 705/44 |
| 5,999,596 A | 12/1999 | Walker et al. | 379/91.01 |
| 6,026,166 A | 2/2000 | LeBourgeois | |
| 6,029,151 A | 2/2000 | Nikander | 705/39 |
| 6,102,287 A | 8/2000 | Matyas, Jr. | 235/380 |
| 6,169,890 B1 | 1/2001 | Vatanen | |
| 6,227,447 B1 | 5/2001 | Campisano | |
| 6,267,292 B1 | 7/2001 | Walker et al. | 235/379 |
| 6,311,167 B1 | 10/2001 | Davis et al. | 705/35 |
| 6,327,348 B1 | 12/2001 | Walker et al. | 379/91.01 |
| 6,366,893 B2 | 4/2002 | Hannula et al. | 705/40 |
| 6,422,460 B1 * | 7/2002 | Boesch | 235/380 |
| 6,442,532 B1 | 8/2002 | Kawan | 705/35 |
| 6,456,984 B1 | 9/2002 | Demoff et al. | 705/40 |
| 6,597,770 B2 | 7/2003 | Walker et al. | 379/93.12 |
| 6,764,003 B1 | 7/2004 | Martschitsch et al. | 235/383 |
| 6,807,410 B1 | 10/2004 | Pailles et al. | 455/407 |
| 6,868,391 B1 | 3/2005 | Hultgren | 705/26 |
| 6,873,974 B1 | 3/2005 | Schutzer | 705/41 |
| 6,941,270 B1 | 9/2005 | Hannula | 705/1 |
| 6,988,657 B1 | 1/2006 | Singer et al. | 235/380 |
| 7,003,493 B2 | 2/2006 | Weichert et al. | 705/39 |
| 7,014,107 B2 | 3/2006 | Singer et al. | 235/380 |
| 7,014,109 B2 | 3/2006 | Hjelmvik | 235/382 |
| 7,031,939 B1 | 4/2006 | Gallagher et al. | 705/39 |

(Continued)

FOREIGN PATENT DOCUMENTS

| | | |
|---|---|---|
| EP | 1280115 | 1/2003 |
| WO | 9834203 | 8/1998 |
| WO | 2008027620 | 3/2008 |

OTHER PUBLICATIONS

"Top of Our Radar: Next Generation Mobile Phone with Tap & Go ™ Payment in New York City", M2 Presswire. Coventry. Dec. 15, 2006. p. 1.*

(Continued)

*Primary Examiner* — Mohammad Z Shaikh
(74) *Attorney, Agent, or Firm* — Snell & Wilmer L.L.P.

(57) ABSTRACT

A method of operating a mobile phone as a financial transaction instrument is provided. Security features, which can disable the mobile phone so as to prevent account information from being transmitted, incorporate transaction limits and the use of a personal identification number.

12 Claims, 7 Drawing Sheets

(56) References Cited

U.S. PATENT DOCUMENTS

| | | | | |
|---|---|---|---|---|
| 7,054,835 | B2 | 5/2006 | Nanbu et al. | 705/26 |
| 7,089,208 | B1 | 8/2006 | Levchin et al. | 705/39 |
| 7,096,003 | B2 | 8/2006 | Joao et al. | 455/406 |
| 7,099,850 | B1 | 8/2006 | Mann, II et al. | 705/64 |
| 7,103,576 | B2 | 9/2006 | Mann, III et al. | 705/64 |
| 7,107,078 | B2 | 9/2006 | Lehto | 455/566 |
| 7,107,250 | B2 | 9/2006 | Harrison | 705/76 |
| 7,120,608 | B1 | 10/2006 | Gallagher et al. | 705/68 |
| 7,124,937 | B2 | 10/2006 | Myers et al. | 235/380 |
| 7,131,571 | B2 | 11/2006 | Swift et al. | 235/375 |
| 7,136,836 | B1 | 11/2006 | Washizuka et al. | 705/76 |
| 7,139,694 | B2 | 11/2006 | Horn et al. | 703/69 |
| 7,146,342 | B1 | 12/2006 | Angelin et al. | 705/76 |
| 7,152,782 | B2 | 12/2006 | Shenker et al. | 235/376 |
| 7,239,226 | B2 | 7/2007 | Berardi et al. | 340/5.61 |
| 7,249,112 | B2 | 7/2007 | Berardi et al. | 705/79 |
| 7,610,040 | B2* | 10/2009 | Cantini et al. | 455/410 |
| 8,352,376 | B2* | 1/2013 | Yuen et al. | 705/64 |
| 2001/0037264 | A1 | 11/2001 | Husemann et al. | |
| 2002/0004770 | A1 | 1/2002 | Phillips et al. | |
| 2003/0022655 | A1 | 1/2003 | Bogat | |
| 2003/0055785 | A1 | 3/2003 | Lahiri | |
| 2003/0074328 | A1 | 4/2003 | Schiff et al. | |
| 2003/0105707 | A1* | 6/2003 | Audebert et al. | 705/38 |
| 2003/0112783 | A1 | 6/2003 | Rankin | |
| 2003/0222138 | A1* | 12/2003 | Oppenlander et al. | 235/380 |
| 2004/0030652 | A1 | 2/2004 | Grunzig et al. | |
| 2004/0185830 | A1 | 9/2004 | Joao et al. | |
| 2004/0210519 | A1* | 10/2004 | Oppenlander et al. | 705/39 |
| 2005/0038736 | A1 | 2/2005 | Saunders | 705/39 |
| 2005/0049974 | A1* | 3/2005 | Jani et al. | 705/64 |
| 2005/0187873 | A1 | 8/2005 | Labrou et al. | |
| 2005/0187882 | A1 | 8/2005 | Sovio et al. | |
| 2005/0246181 | A1 | 11/2005 | Kawahara | |
| 2006/0018450 | A1 | 1/2006 | Sandberg-Diment | |
| 2006/0080232 | A1 | 4/2006 | Epps | |
| 2006/0122921 | A1* | 6/2006 | Comerford et al. | 705/35 |
| 2006/0144932 | A1 | 7/2006 | Bendeck et al. | |
| 2006/0163349 | A1 | 7/2006 | Neugebauer et al. | |
| 2006/0167823 | A1* | 7/2006 | York et al. | 705/76 |
| 2006/0235758 | A1 | 10/2006 | Schleicher | |
| 2006/0258397 | A1 | 11/2006 | Kaplan et al. | |
| 2006/0273158 | A1* | 12/2006 | Suzuki | 235/380 |
| 2006/0278698 | A1* | 12/2006 | Lovett | 235/380 |
| 2006/0278704 | A1 | 12/2006 | Saunders et al. | |
| 2006/0287004 | A1* | 12/2006 | Fuqua | 455/558 |
| 2007/0001001 | A1 | 1/2007 | Myers et al. | |
| 2007/0011099 | A1* | 1/2007 | Sheehan | 705/65 |
| 2007/0050259 | A1* | 3/2007 | Wesley | 705/16 |
| 2007/0106558 | A1 | 5/2007 | Mitchell et al. | |
| 2007/0130025 | A1 | 6/2007 | Nakajima | |
| 2007/0187491 | A1* | 8/2007 | Godwin et al. | 235/380 |
| 2007/0192245 | A1 | 8/2007 | Fisher et al. | |
| 2007/0215696 | A1* | 9/2007 | Macnish | 235/380 |
| 2007/0226051 | A1* | 9/2007 | Addepalli et al. | 705/14 |
| 2007/0233615 | A1 | 10/2007 | Tumminaro | |
| 2007/0255652 | A1* | 11/2007 | Tumminaro et al. | 705/39 |
| 2007/0255653 | A1* | 11/2007 | Tumminaro et al. | 705/39 |
| 2007/0262134 | A1 | 11/2007 | Humphrey et al. | |
| 2007/0262139 | A1* | 11/2007 | Fiebiger et al. | 235/380 |
| 2008/0046366 | A1* | 2/2008 | Bemmel et al. | 705/44 |
| 2008/0155257 | A1* | 6/2008 | Werner et al. | 713/168 |
| 2008/0255993 | A1* | 10/2008 | Blinbaum | 705/44 |
| 2009/0106119 | A1* | 4/2009 | Mathai et al. | 705/26 |
| 2010/0049655 | A1* | 2/2010 | Nilsson et al. | 705/44 |
| 2011/0191280 | A1 | 8/2011 | Takahashi | |

OTHER PUBLICATIONS

MasterCard and VeriFone Announce First Ever Tap & Go ™ payments in Taxis, Business Wire. New York: Nov. 15, 2006.*

"Top of Our Radar: Next Generation Mobile Phone with Tap & Go TM Payment in New York City", M2 Presswire. Coventry. Dec. 15, 2006. p. 1.*

MasterCard and VeriFone Announce First Ever Tap & Go TM payments in Taxis, Business Wire. New York: Nov. 15, 2006.*

"News Digest: Nokia launches mobile payment NFC handset", Electronic Payments International. London: Jan. 2007. p. 4.*

Fest, Glen, "Mobile Payments: Fair Play in HSBC Phone Pay Trial; Accounting for issuer, carrier and merchant interests is a key advance for this contactless pilot", Bank Technology News. New York: Mar. 2007. vol. 20, iss. 3; pp. 1-3.*

"MasterCard and VeriFone Announce First Ever 'Tap & GoT™' Payments in Taxis", Business Wire. New York: Nov. 15, 2006, pp. 1-4.*

"News Digest: Nokia launches mobile payment NFC handset", Electronic Payments International. London: Jan. 2007, pp. 1-2.*

"Mobile payment initiatives grow", Electronic Payments International (Jan. 2006), pp. 1-2.*

Balaban, Dan; Reuter, Thad., "Is the World Ready for Contactless Payment?", Card Technology 11.5 (May 2006), pp. 38-52.*

"Mobile Payment: A Journey Through Existing Procedures and Standardization Initiatives", by Karnouskos et al, for IEEE Communications Surveys, The Electronic Magazine of Original Peer-Reviewed Survey Articles, Fourth Quarter 2004, vol. 6, No. 4, pp. 44-46.*

"A Cash Call—Smart cards and mobile phones are quickly emerging as ways to pay with electronic cash", The Economist, Feb. 17, 2007.

ViVOtech, Inc., "RF-Based Contactless Payment: White Paper," Apr. 2006.

http://www.vivotech.com/, "Contactless & NFC Mobile Phone Payments," Oct. 11, 2007.

http://www.ti.com/rfid/shtml/apps-contactless.shtml, "TI-RFid™ & Contactless Commerce," Oct. 11, 2007.

EP; European Examination Report received Dec. 13, 2011 in Application No. 08746398.0.

AU; Examination Report dated Dec. 19, 2011 in Application No. 2008245878.

EP; European Supplemental Search Report received Dec. 22, 2011 in Application No. 08746926.8.

AU; Examination Report dated Jan. 25, 2012 in Application No. 2008245668.

AU; Examination Report dated Jan. 25, 2012 in Application No. 2008245880.

PCT; Written Opinion dated Jun. 9, 2008 in Application No. PCT/US2008/061602.

PCT; International Preliminary Report on Patentability dated Oct. 27, 2009 in Application No. PCT/US2008/061602.

PCT; International Search Report dated Jun. 27, 2008 in Application No. PC/US2008/061602.

USPTO; Office Action dated Aug. 6, 2008 in U.S. Appl. No. 11/741,243.

USPTO; Final Office Action dated Feb. 3, 2009 in U.S. Appl. No. 11/741,243.

USPTO; Advisory Action dated May 20, 2009 in U.S. Appl. No. 11/741,243.

USPTO; Office Action dated Jun. 17, 2009 in U.S. Appl. No. 11/741,243.

USPTO; Office Action dated Sep. 18, 2009 in U.S. Appl. No. 11/741,243.

USPTO; Final Office Action dated Mar. 26, 2010 in U.S. Appl. No. 11/741,243.

USPTO; Advisory Action dated Jun. 7, 2010 in U.S. Appl. No. 11/741,243.

USPTO; Office Action dated May 30, 2008 in U.S. Appl. No. 11/741,170.

USPTO; Final Office Action dated Feb. 17, 2009 in U.S. Appl. No. 11/741,170.

USPTO; Office Action dated May 12, 2009 in U.S. Appl. No. 11/741,170.

USPTO; Final Office Action dated Dec. 24, 2009 in U.S. Appl. No. 11/741,170.

USPTO; Office Action dated Mar. 10, 2010 in U.S. Appl. No. 11/741,170.

USPTO; Office Action dated Aug. 19, 2010 in U.S. Appl. No. 11/741,170.

USPTO; Office Action dated Jan. 28, 2011 in U.S. Appl. No. 11/741,170.

USPTO; Office Action dated Dec. 11, 2009 in U.S. Appl. No. 11/741,288.

USPTO; Final Office Action dated Jun. 23, 2010 in U.S. Appl. No. 11/741,288.
USPTO; Advisory Action dated Aug. 30, 2010 in U.S. Appl. No. 11/741,288.
USPTO; Office Action dated Oct. 8, 2010 in U.S. Appl. No. 11/741,288.
USPTO; Final Office Action dated Mar. 11, 2011 in U.S. Appl. No. 11/741,288.
EP; European Search Report dated Mar. 22, 2011 in Application No. 08746398.0.
EP; European Search Report dated Mar. 22, 2011 in Application No. 08746400.4.
PCT; International Search Report and Written Opinion dated Jul. 1, 2008 in Application No. PCT/US2008/061604.
PCT; International Preliminary Report on Patentability dated Oct. 27, 2009 in Application No. PCT/US2008/061604.
PCT; International Search Report and Written Opinion dated Aug. 29, 2008 in Application No. PCT/US2008/060972.
PCT; International Preliminary Report on Patentability dated Oct. 27, 2009 in Application No. PCT/US2008/060972.
PCT; International Search Report and Written Opinion dated Aug. 13, 2008 in Application No. PCT/US2008/060970.
PCT; International Preliminary Report on Patentability dated Oct. 27, 2009 in Application No. PCT/US2008/060970.
AU; Examination Report dated Jan. 18, 2011 in Application No. 2008245878.
"Giesecke & Devrient and MasterCard International Launch World's first over the air personalization solution for mobile phonebased payments", Business. New York: Apr. 5, 2006. p. 1.
USPTO; Final Office Action dated Mar. 29, 2012 in U.S. Appl. No. 11/741,288.
USPTO; Advisory Action dated May 24, 2012 in U.S. Appl. No. 11/741,288.
MX; Mexican Office Action dated Mar. 2012 in Application No. MX/a/2009/011630.
AU; Examiner's Second Report dated Jun. 20, 2011 in Application No. 2008245878.
USPTO; Final Office Action dated Jun. 30, 2011 in U.S. Appl. No. 11/741,170.
USPTO; Advisory Action dated May 23, 2011 in U.S. Appl. No. 11/741,288.
Office Action dated May 30, 2012 in Canadian Application No. 2,685,414.
Mexican Office Action received Jun. 8, 2012 in Application No. MX/a/2009/011633.
Mexican Office Action received Jun. 7, 2012 in Application No. MX/a/2009/011631.
USPTO; Office Action dated Sep. 15, 2011 in U.S. Appl. No. 11/741,288.
USPTO; Advisory Action dated Sep. 8, 2011 in U.S. Appl. No. 11/741,170.
AU; Examination Report dated Mar. 3, 2011 in Application No. 2008245666.
EP; European Search Report dated Jun. 23, 2011 in Application No. 08746927.6.
Australian Exam Report dated Aug. 17, 2012 in Application No. 2008245668.
Mexican Office Action received Sep. 25, 2012 in Application No. MX/a/2009/011630.
AU; Examination Report dated Sep. 7, 2011 in Application No. 2008245878.
USPTO; Office Action dated Feb. 21, 2013 in U.S. Appl. No. 11/741,170.
USPTO; Office Action dated Apr. 8, 2013 in U.S. Appl. No. 11/741,288.
Examination Report dated Apr. 9, 2013 in European Application No. 08746927.6.
Mexican Office Action received Apr. 16, 2013 in Application No. MX/a/2009/011631.
Mexican Office Action received Apr. 17, 2013 in Application No. MX/a/2009/011633.
Mexican Office Action received May 7, 2013 in Application No. MX/a/2009/011630.
USPTO; Office Action dated Apr. 25, 2013 in U.S. Appl. No. 11/741,243.

* cited by examiner

USER EXPERIENCE ON MOBILE PHONE

CROSS REFERENCE TO RELATED APPLICATIONS

This application is related to an application entitled Payment Application Download to Mobile Phone and Phone Personalization, which is being concurrently filed and which is hereby incorporated herein by reference.

BACKGROUND OF THE INVENTION

1. Field of the Invention

The present invention relates generally to mobile payments, and more specifically to the use of a payment application on a mobile phone.

2. Related Art

Mobile or cellular phones can be adapted to be used as payment devices to pay for the purchase of goods and services. As an example, mobile phones can incorporate the express-pay technology found, for instance, in some credit or debit cards, wherein a radio frequency identification (RFID) chip containing a small microcontroller and metal antenna is embedded in the plastic of the card and replaces the traditional authenticating function of a magnetic stripe bearing cardholder information.

A mobile phone user who has a transaction account such as an American Express®, Visa®, MasterCard®, or Discover® account can adapt the phone for use as a payment device in one of several ways currently in development.

For example, the user can visit a secure website in order to request that a payment application and personal account information be transmitted to the user's mobile phone. In this method, the user might provide his or her transaction account number, the telephone number of the user's mobile phone, and verification information (such as personal information or a password) at a computer connected to the Internet. When the provider of the transaction account receives the user's information over the Internet, the provider verifies the information and preferably associates the user's transaction account number with the telephone phone of the user's mobile phone.

Alternatively, the mobile phone user can call a customer service representative of the provider of the transaction account in order to request that a payment application and personal account information be transmitted to the user's mobile phone. In this method, all of the information necessary to complete the request is provided by the user over the telephone.

A third option is for the mobile phone user to fill out a paper form with all of the information associated with a request that a payment application and personal account information be transmitted to the user's mobile phone. The completed paper form is then mailed or personally delivered by the user to the provider of the transaction account.

In each case, after the provider verifies the received information and preferably associates the user's transaction account number with the telephone number of the user's mobile phone, the user is able to download a payment application to the mobile phone and to use the mobile phone as a payment device.

Typical downloading methods can be used, such as by plugging the mobile phone into a computer in which the necessary software has been stored, or which can provide a conduit to an Internet site at which the software is located.

The above-identified related application, Payment Application Download to Mobile Phone and Phone Personalization, which is being concurrently filed with this application, provides a fast and reliable way to securely personalize a payment application using a mobile phone in a manner that does not require the establishment of an online connection in order to achieve successful downloads.

There is, however, a need in the art for an improved method of operating a mobile phone application. There is also a need to provide security features to the payment application on a mobile phone that has been enabled for use as a payment device, in order to enhance user experience and confidence in the payment application.

BRIEF DESCRIPTION OF THE INVENTION

The present invention meets the above-identified needs by providing a method of operating a mobile phone as a financial transaction instrument. The invention involves software options for the use of a mobile phone (or other mobile device such as a personal digital assistant) enabled as a payment device.

With the present invention, a mobile phone can function as a payment device as well as a device for making telephone calls and the like. Thus, the phone can conveniently be used as a financial transaction instrument in lieu of a traditional financial transaction instrument, such as a credit card.

The invention provides a method of operating a mobile phone having financial transaction account information of a user, an application for operating the mobile phone, and a transmitter for transmitting information of the user to a reader.

In one embodiment, the method comprises receiving financial transaction account information of the user and transaction information of a financial transaction, processing the received information, and communicating with the user's mobile phone over a wireless network to receive and/or transmit information related to the transaction information. Thus, the provider of the financial transaction account can provide, to a user, account information that could not otherwise be provided without a conventional credit card.

An advantage of the present invention is that security features, such as the use of a personal identification number and the setting of transaction limits, can be provided to the payment application on a mobile phone that has been enabled for use as a payment device. Thus, if the user should lose the mobile phone, unauthorized transactions made using the mobile phone by another person may be minimized or avoided altogether. The security features enhance user confidence in using the payment application on the mobile phone.

A further advantage of the present invention is that, when the mobile phone user uses the phone as a financial transaction instrument, information about a financial transaction can be provided to the user, preferably, over a wireless network. This allows for account information to be provided to a user through a mobile phone or the like, which is not possible with traditional credit cards.

The invention also provides a method of operating a mobile phone as a financial transaction instrument comprising processing a request for merchant information including information regarding an available voucher, providing merchant information to the mobile phone over a wireless network, processing a request to redeem the available voucher, and providing the voucher information to the mobile phone over a wireless network.

Additionally, the invention provides a method of operating a mobile phone as a financial transaction instrument comprising detecting with a tracker that a user is in the vicinity of a merchant and providing merchant information including information regarding an available voucher to the mobile phone over a wireless network.

Further features and advantages of the present invention will become more apparent in view of detailed description of the present invention, taken together with the accompanying drawings, in which the left-most digit of a reference number identifies the drawing in which the reference number first appears.

DETAILED DESCRIPTION

A "transaction account" as used herein refers to an account associated with an open account or a closed account system, as described below. The transaction account may exist in a physical or non-physical embodiment. For example, a transaction account may be distributed in non-physical embodiments such as an account number, frequent-flyer account, telephone calling account, or the like. Furthermore, a physical embodiment of a transaction account may be distributed as a financial transaction instrument.

A "financial transaction instrument" may be traditional plastic transaction cards, titanium-containing, or other metal-containing, transaction cards, clear and/or translucent transaction cards, foldable or otherwise unconventionally-sized transaction cards, radio-frequency enabled transaction cards, or other types of transaction cards, such as credit, charge, debit, pre-paid or stored-value cards, or any other like financial transaction instrument. A financial transaction instrument may also have electronic functionality provided by a network of electronic circuitry that is printed or otherwise incorporated onto or within the transaction instrument (and typically referred to as a "smart card"), or it may be a fob having a transponder and an RFID reader. A financial transaction instrument with this electronic functionality can be brought within a certain distance from a reader (for example, a merchant's RFID reader) so as to transmit financial transaction account information to the reader (for example, in order to purchase goods or services from the merchant).

"Open cards" are financial transaction cards that are generally accepted at different merchants. Examples of open cards include American Express®, Visa®, MasterCard®, and Discover® cards, which may be used at many different retailers and other businesses. In contrast, "closed cards" are financial transaction cards that may be restricted to use in a particular store, a particular chain of stores, or a collection of affiliated stores. One example of a closed card is a pre-paid gift card that may only be purchased at, and only be accepted at, a clothing retailer, such as The Gap® store.

Stored value cards are forms of transaction instruments associated with transaction accounts, wherein the stored value cards provide cash equivalent value that may be used within an existing payment/transaction infrastructure. Stored value cards are frequently referred to as gift, pre-paid, or cash cards, in that money is deposited in the account associated with the card before use of the card is allowed. For example, if a customer deposits ten dollars of value into the account associated with the stored value card, the card may only be used for payments up to ten dollars. The present invention encompasses the use of a mobile phone or other mobile device configured to be used as a stored value card.

With regard to use of a transaction account, users may communicate with merchants in person (e.g., at the box office), telephonically, or electronically (e.g., from a user computer via the Internet). During the interaction, the merchant may offer goods and/or services to the user. The merchant may also offer the user the option of paying for the goods and/or services using any number of available transaction accounts. Furthermore, the transaction accounts may be used by the merchant as a form of identification of the user. The merchant may have a computing unit implemented in the form of a computer-server, although other implementations are possible.

In general, transaction accounts may be used for transactions between the user and merchant through any suitable communication device, such as the following: a telephone network; an intranet; the global, public Internet; a point of interaction device (e.g., a point of sale (POS) device, personal digital assistant (PDA), mobile phone, kiosk, etc.); online communications; off-line communications; wireless communications; and/or the like.

An "account," "account number," or "account code", as used herein, may include any device, code, number, letter, symbol, digital certificate, smart chip, digital signal, analog signal, biometric, or other identifier/indicia suitably configured to allow a consumer to access, interact with, or communicate with a financial transaction system. The account number may optionally be located on or associated with any financial transaction instrument (e.g., a rewards, charge, credit, debit, prepaid, telephone, embossed, smart, magnetic stripe, bar code, transponder, or radio frequency card).

The account number may be distributed and stored in any form of plastic, electronic, magnetic, radio frequency (RF), wireless, audio, and/or optical device capable of transmitting or downloading data from itself to a second device. A customer account number may be, for example, a sixteen-digit credit card number. Each credit card issuer has its own numbering system, such as the fifteen-digit numbering system used by American Express Company of New York, N.Y. Each issuer's credit card numbers comply with that company's standardized format such that an issuer using a sixteen-digit format will generally use four spaced sets of numbers in the form of:

$N_1N_2N_3N_4\ N_5N_6N_7N_8\ N_9N_{10}N_{11}N_{12}\ N_{13}N_{14}N_{15}N_{16}$

The first five to seven digits are reserved for processing purposes and identify the issuing institution, card type, and so on. In this example, the last (sixteenth) digit is typically used as a sum check for the sixteen-digit number. The intermediary eight-to-ten digits are used to uniquely identify the customer, cardholder, or card member.

A merchant account number may be, for example, any number or alpha-numeric characters that identify a particular merchant for purposes of card acceptance, account reconciliation, reporting, and the like.

The terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an online merchant or the like.

"Personalizing" refers to enabling a device with an application including user-specific information.

Figure 5:
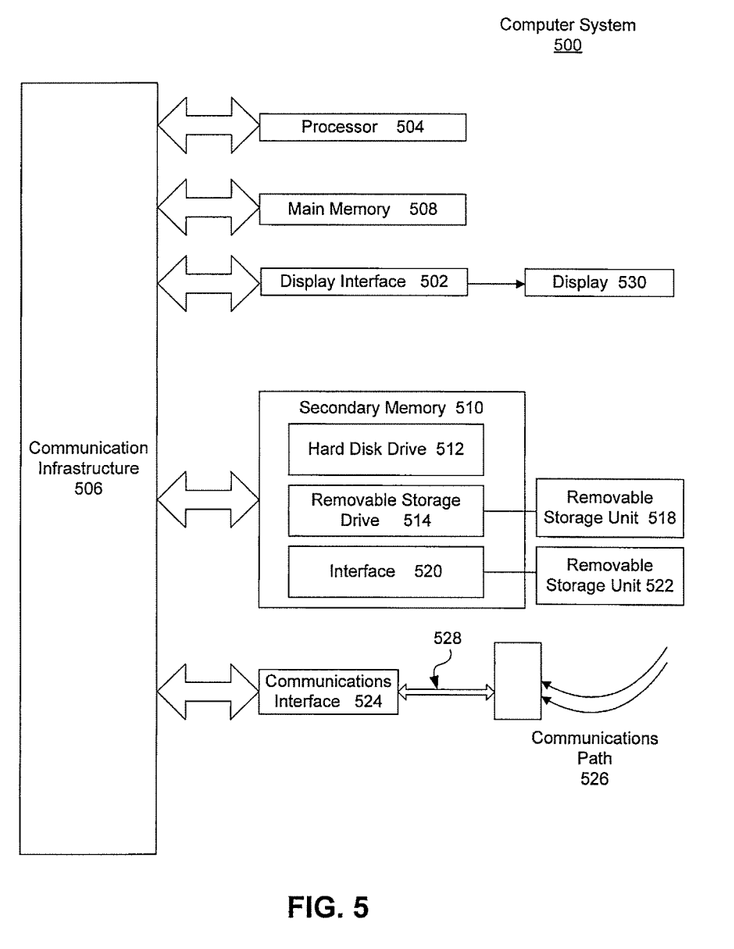
FIG. 5 shows a computer system employed in the process of personalizing a device over a wireless network.

An example of a computer system 500 employed in the process of personalizing a device over a wireless network is shown in FIG. 5.

The computer system 500 includes one or more processors, such as processor 504. The processor 504 is connected to a communication infrastructure 506 (e.g., a communications bus, cross-over bar, or network). After reading this description, it will become apparent to a person skilled in the relevant art(s) how to personalize a device over a wireless network using other computer systems and/or architectures.

Computer system 500 can include a display interface 502 that forwards graphics, text, and other data from the communication infrastructure 506 (or from a frame buffer not shown) for display on the display unit 530.

Computer system 500 also includes a main memory 508, preferably random access memory (RAM), and may also include a secondary memory 510. The secondary memory 510 may include, for example, a hard disk drive 512 and/or a removable storage drive 514, representing a floppy disk drive, a magnetic tape drive, an optical disk drive, and so on. The removable storage drive 514 reads from and/or writes to a removable storage unit 518 in a well-known manner. Removable storage unit 518 represents a floppy disk, magnetic tape, optical disk, and so on, which is read by and written to by removable storage drive 514. As will be appreciated, the removable storage unit 518 includes a computer usable storage medium having stored therein computer software and/or data.

In alternative embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as that found in video game devices), a removable memory chip (such as an erasable programmable read only memory (EPROM), or programmable read only memory (PROM)) and associated socket, and other removable storage units 522 and interfaces 520, which allow software and data to be transferred from the removable storage unit 522 to computer system 500.

Computer system 500 may also include a communications interface 524. Communications interface 524 allows software and data to be transferred between computer system 500 and external devices. Examples of communications interface N24 may include a modem, a network interface (such as an Ethernet card), a communications port, a Personal Computer Memory Card International Association (PCMCIA) slot and card, and so on. Software and data transferred via communications interface 524 are in the form of signals 528 which may be electronic, electromagnetic, optical, or other signals capable of being received by communications interface 524. These signals 528 are provided to communications interface 524 via a communications path (e.g., channel) 526. This channel 526 carries signals 528 and may be implemented using wire or cable, fiber optics, a telephone line, a cellular link, a radio frequency (RF) link, and other communications channels.

In this document, the terms "computer program medium" and "computer usable medium" are used to generally refer to media such as removable storage drive 514, a hard disk installed in hard disk drive 512, and signals 528. These computer program products provide software to computer system 500.

Computer programs (also referred to as computer control logic) are stored in main memory 508 and/or secondary memory 510. Computer programs may also be received via communications interface 524. Such computer programs, when executed, enable the computer system 500 to perform the features of the present invention, as discussed herein. In particular, the computer programs, when executed, enable the processor 504 to perform the features of the present invention. Accordingly, such computer programs represent controllers of the computer system 500.

In an embodiment where the invention is implemented using software, the software may be stored in a computer program product and loaded into computer system 500 using removable storage drive 514, hard drive 512, or communications interface 524. The control logic (software), when executed by the processor 504, causes the processor 504 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 6:
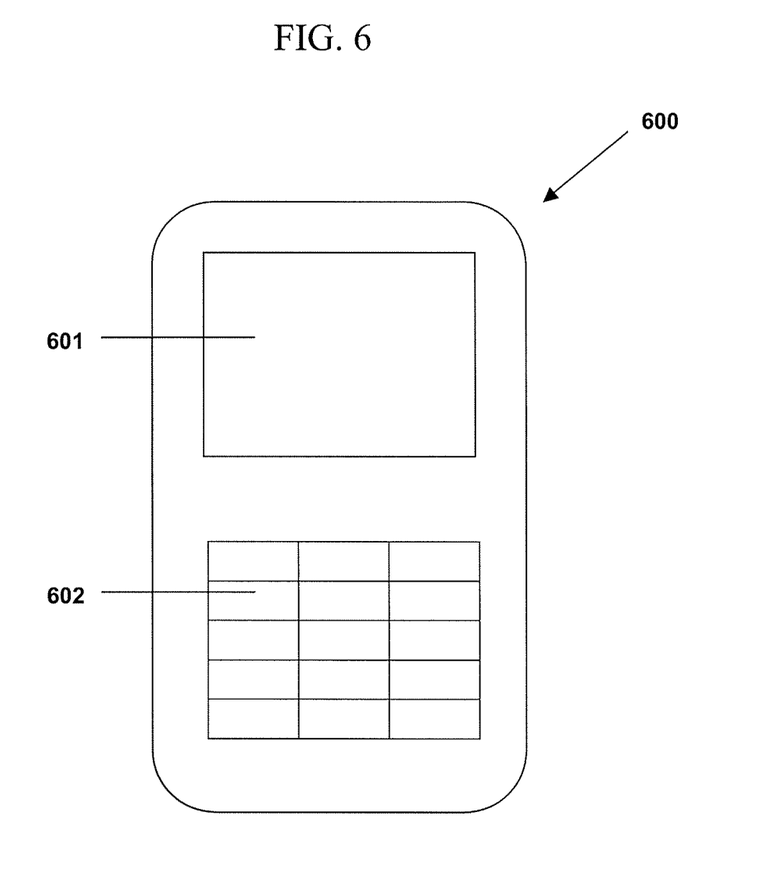
FIG. 6 schematically shows the front side of a typical mobile phone.
Figure 7:
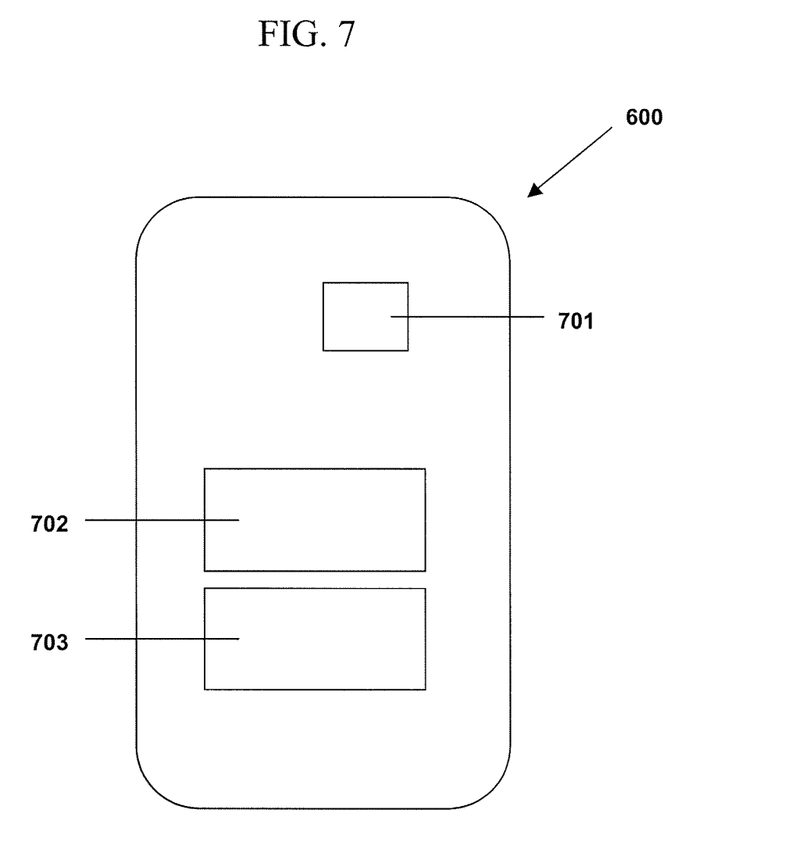
FIG. 7 schematically shows selected components inside the mobile phone of FIG. 6.

FIG. 6 shows the front side of a typical mobile phone 600 with a display screen 601 and a keypad 602. As shown in FIG. 7, which depicts selected components inside the mobile phone 600, the mobile phone 600 includes at least one transmitter (or transceiver) 701, a processing block 702, and a memory block 703. As would be understood by one of skill in the art in light of the present description, the mobile phone 600 can communicate with the computer system 500, for example, over a wireless network.

Typically, in order to be operated as a financial transaction instrument, the user's mobile phone 600 is provided, within the processing block 702, with an application programming interface, such as Java 2 Micro Edition (J2ME), as well as a secure element provided with a smart card operating system such as Java Card OpenPlatform (JCOP). JCOP has a Java Virtual Machine (JVM), which allows the running of applications written in Java programming language. Other operating systems or platforms, secure elements, and programming languages may be employed. The mobile phone 600 is typically also provided with a transmitter (or a transceiver) 701 with electronic functionality, which can be used to transmit information to a reader, such as a financial transaction instrument reader belonging to a merchant. (If the phone is provided with a transceiver, it can receive as well as transmit information.) Thus, the phone can be converted into a payment device that can take the place of a traditional credit card or the like. In other embodiments, the phone may have some other mechanism for providing information to an instrument reader (for example, physical connection means, light, and so on).

As would be understood by one of ordinary skill in the art in light of the present application, the present invention is not limited to the use of mobile phones. Other mobile devices, such as personal digital assistants, can also be securely personalized over a wireless network and used as a payment device.

The present invention enhances the functionality of payment devices by, among other improvements, providing security features and allowing for account information to be provided to a user through a mobile phone or the like.

Process

Figure 1:
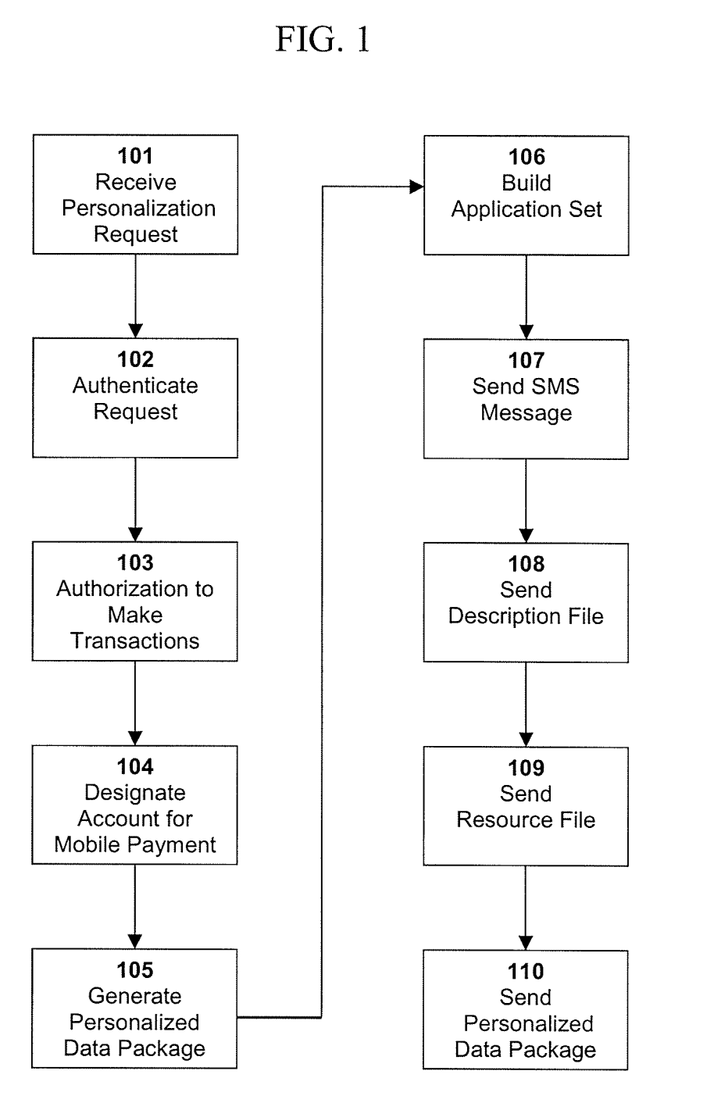
FIG. 1 is a flowchart illustrating a process of personalizing a device over a wireless network.

With reference to FIG. 1, the process of adapting a mobile phone or other mobile device for use as a payment device will now be described. (In the following description, the mobile phone being referred to may be the mobile phone 300 shown in FIGS. 3 and 4, and the events occurring at a provider's side may be implemented using the computer system 200 shown in FIG. 2.) The provider of a transaction account owned by a mobile phone user receives a request (101) from the user to personalize the mobile phone with user-specific information associated with the transaction account. This request may be made, for example, by sending a message from the mobile phone by Short Message Service (SMS). Other wireless methods, such as Multimedia Messaging Service, may be employed for sending the request. Typically, the request includes the account number associated with the transaction account. The request may include other information such as the name of the account owner, a username, and a password. The user may also send the request by visiting a website of the provider through a computer terminal or by visiting the website through the mobile phone. The request is received at the provider's side at, for example, a host server, and is authenticated (102) at the provider's side. (Alternatively, a third party "over-the-air" service could perform the authentication on behalf of the provider.) Authentication means establishing the identity of the mobile phone user, and specifically, establishing that the user is the owner of the transaction account. The request is then authorized at the provider's side (103). Authorization means allowing the owner of the transaction account (that is, the mobile phone user) to interact with the transaction account using the mobile phone.

Following authorization (103), the transaction account is designated at the provider's end as permitting mobile payment (104), that is, the provider preferably establishes a record of the authorization of the owner to interact with the transaction account through the mobile phone. In addition, a personalized data package, which includes user-specific information that is unique to the owner of the transaction account, is generated (105) at the provider's end. This is information for installation into the mobile phone to enable its use as a financial transaction instrument. An application set is built (106) based on that information. The application set includes a description file (described below) to be downloaded to a mobile device; it also includes the personalized data package generated in step 105.

It will be appreciated by one of ordinary skill in the art, in light of the present application, that steps 101 through 106 can be fully automated at the provider's side (using hardware and/or software such as one or more computer systems or other processing systems running software programs), or they can incorporate human input (for example, a person at the provider's side can check a database to confirm that a transaction account for the user does exist).

From the provider's side, an SMS message is sent to the mobile phone of the user (107), either completely automatically or with input from a person. (Other wireless methods, such as Multimedia Messaging Service, may be employed in place of SMS.) The SMS message preferably informs the user that the necessary application(s) are ready for download to the phone. The SMS message also preferably includes a Uniform Resource Locator (URL) address that points to a description file, such as a Java application descriptor file (.JAD file), which is hosted at the provider's side in a web-hosting environment and may be specific to the user. When the user visits the URL, the description file, which is part of the application set built in step 106, may be downloaded (108). This preferably occurs automatically when the user contacts the web-hosting environment. The JAD file preferably contains another URL leading to a resource file, such as a Java archive file (.JAR file), which is hosted at the provider's side in a web-hosting environment, and that comprises software that will perform as a payment application (further described later) once installed on the mobile phone. The .JAD file also preferably contains instructions on how to obtain the personalized data package generated in step 105 (for example, the .JAD can provide an URL leading to the personalized data package generated in step 105). Preferably, when the .JAD file is read by the mobile phone for the first time, the URL to the resource file is submitted, thereby causing the downloading of the resource file (109) to the mobile phone, where it is to be executed in the main operating environment of the phone. The main operating system of the phone, which is J2ME in this embodiment, functions to control the keypad of the phone, the display screen, and so on.

If the user chooses to execute the JAR file and run the included software in the main operating environment, then the personalized data package generated in step 105 is sent to the mobile phone (110). (This can occur, for example, through accessing a personalized data package URL in the .JAD file.) The downloaded personalized data package is initially stored in a main memory of the phone associated with the main operating environment. The personalized data package includes a unique personalization file containing information specific to the owner of the transaction account. Internal logic in the executed JAR file and the phone's application programming interface (J2ME) work together to implement the personalized data package onto the phone by pushing the personalized data package into a secure element of the phone. The secure element is generally a module that is resistant to improper physical and electronic tampering, and thus is suitable for storing sensitive information. In this embodiment, the secure element is a tamper resistant module that conforms to Federal Information Processing Standard (FIPS) 140-2. More specifically, in this embodiment, the secure element is a secure card that uses the JCOP operating system. With the implementation of the personalized data package, the secure element in the phone has been personalized with the financial transaction account information. (Preferably, the executed JAR file then deletes the personalized data package from the main memory of the phone as a precaution against unwanted access to the data package should the phone be lost.)

Instead of having the description file contain instructions on how to obtain the personalized data package (which includes the unique personalization file containing information specific to the owner of the transaction account), the description file can directly contain the information specific to the owner of the transaction account. In this case, if the user chooses to execute the .JAR file, the information specific to the owner of the transaction account is accessed from the .JAD file and implemented onto the phone, into the secure element.

The downloaded software, once installed on the mobile phone, performs as a payment application. Specifically, the software provides the phone with functionality to transmit financial transaction account information using a transmitter, allows the user to operate the financial transaction account system on the phone, and allows for wireless communication between the phone and the provider. That is, the mobile phone, having been provided with a payment application, is configured to operate as a financial transaction instrument and can be used as a payment device. The mobile phone can now be operated to transmit financial transaction account information of the user (such as the information downloaded in step 110) from the mobile phone to a reader such as a merchant's financial transaction instrument reader. Thus, the mobile phone user does not need to carry a traditional financial transaction instrument, such as a credit card, in order to be able to purchase goods and services. One example of a payment application is the ExpressPay® Java application from American Express Company.

The above-described process from steps 101 to 110 can be repeated for a plurality of financial transaction accounts, such that the mobile phone can be used in placed of multiple financial transaction instruments. In this way, the mobile phone user can avoid the need to carry numerous traditional cards in order to purchase a variety of goods and services from different types of merchants.

Of course, for purposes of the present invention, the necessary software for operating a mobile phone or other mobile device as a payment device can be downloaded in any number of ways.

Use of Mobile Phone

With additional reference now to FIGS. 2, 3, and 4, improvement in the use of the mobile phone as a payment device according to the present invention and novel features of the system will be described in further detail.

Figure 2:
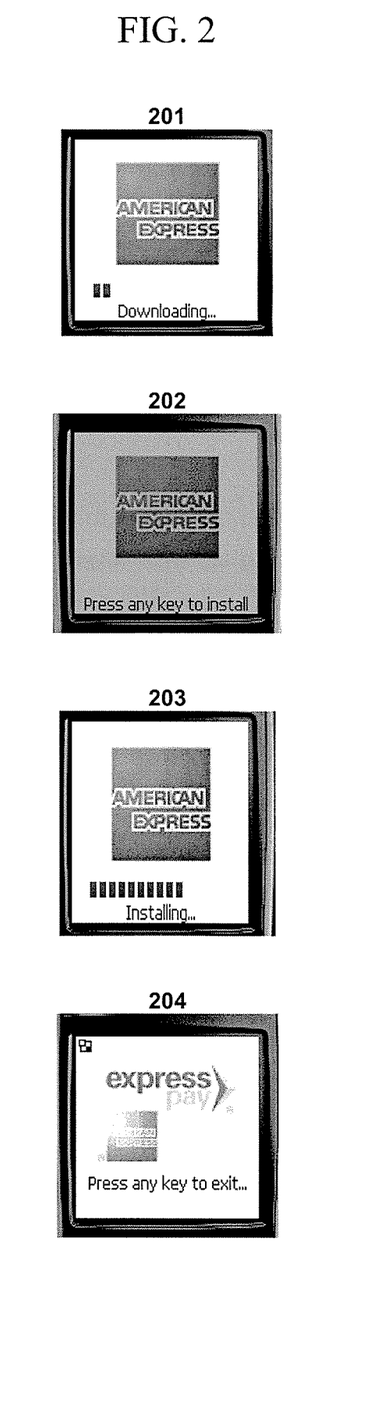
FIG. 2 shows screenshots from a mobile phone during downloading and installation of a payment application on the phone.

FIG. 2 shows screenshots from a mobile phone during downloading and installation of a payment application on the phone. The image captured in screenshot 201 typically appears during the time when a resource file, herein an ExpressPay® Java application JAR file, is being provided to a mobile phone as in step 109 of FIG. 1. Once downloading is complete, the user is prompted to execute the JAR file. As seen in 202, this can be through a message displayed on the screen of the mobile phone reading "Press any key to install." Once the user presses a key on the mobile phone, this response is wirelessly relayed to the provider's side, and the personalized data package (generated in step 105 of FIG. 1) is provided to the mobile phone as in step 110 of FIG. 1. The personalized data package includes a unique personalization file containing information specific to the owner of the transaction account, such as financial transaction account information.

As the personalized data package is being implemented onto the phone, thereby personalizing the secure element in the phone with the financial transaction account information, the screen of the phone indicates that installation is in progress, as shown in 203 of FIG. 2. When installation is successful, this is confirmed to the user. In this example, the screen displays an ExpressPay® logo, as in screenshot 204, to indicate that the mobile phone has been configured with the ExpressPay® payment application and personalized with financial transaction account information of the user. In screenshot 204, there is also the message "Press any key to exit," prompting the user to exit from the confirmation screen. However, the installation process can also be ended without prompting for input from the user.

Figure 3:
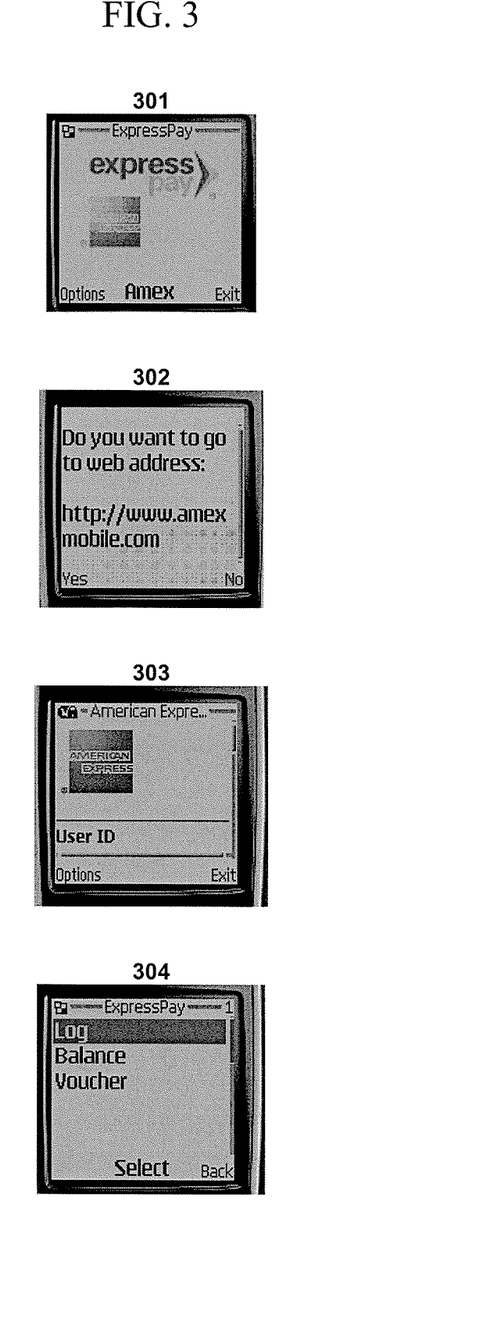
FIG. 3 shows screenshots from a mobile phone during opening and use of a payment application on the phone.

Following successful configuration of the mobile phone as a payment device, the user can choose to open the ExpressPay® payment application, whereupon the screen of the phone displays the image captured in screenshot 301 of FIG. 3. By selecting "Exit" from this screen, the user can easily quit the ExpressPay® application.

Security

Alternatively, at the screen shown in 301, the user can also select "Options" in order to set a personal identification number (PIN) and/or to set a transaction limit.

More specifically, the user can enter a PIN associated with use of the ExpressPay® payment application, which PIN is to be stored in a memory of the mobile phone. The user can choose to set the ExpressPay® application such that the PIN must be entered into the mobile phone every time ExpressPay® is opened on the phone, or before every time the phone is about to transmit information to another device, or at another time when ExpressPay® is running on the phone. By employing the PIN option, the user can prevent the accidental transmission of financial transaction account information, as well as use of the phone by others to make purchases if the user loses the phone. Thus, the PIN feature enhances security of a mobile phone configured with a payment application. However, the PIN feature is not required and the user need not activate it, or the user can choose to inactivate it after activating it.

Another security feature available to the user is the ability to set one or more transaction limits to the ExpressPay® application and to store these limits in the memory of the phone. For example, the user can set a transaction limit of 5, whereby after every fifth transaction made using ExpressPay® from the mobile phone, the next transaction requires affirmative reauthorization from the user, such as entry of the user's PIN. As another example, the user can set a transaction limit of 7 (or another selected number), and then set the phone to prompt the user after the fifth (or other ordinal) transaction that the transaction limit is being approached. The user can respond to the prompt with reauthorization after the fifth or sixth transaction, whereby after the seventh transaction, the user can make additional transactions without needing to provide further reauthorization. However, if the user ignores the prompt, then after the seventh transaction, further reauthorization is definitely required. Thus, the user can have security without the possible inconvenience of entering a PIN for every transaction. Also, through prompting the user for the PIN before authorization expires, there is a buffer period for reentry of the PIN (i.e., reauthorization). Therefore, if the user is in a hurry when the request for reauthorization is made, the buffer period allows the user to wait until a more convenient time to reenter the PIN.

Account Information

When a user uses the phone as a mobile payment device, the phone operates much like a credit card, and more specifically, like ExpressPay® or other similar contactless payment systems. Thus, the user can wave the mobile phone near a reader, such as a merchant's financial transaction instrument reader, to complete a financial transaction. During a transaction between the user and a merchant, the transmitter (or transceiver) in the mobile phone wirelessly transmits the user's financial transaction account information (including, for example, an account number, the user's name, and information corresponding to an "expiration date" of a traditional credit card) to the merchant's financial transaction instrument reader.

The provider of the financial transaction account, American Express Company in this case, receives, from the merchant, the financial transaction account information of the user transmitted from the user's mobile phone to the merchant's financial transaction instrument reader. The provider also receives, from the merchant, transaction information of the financial transaction between the user and the merchant. In a preferred embodiment, the provider processes the transaction information and the financial transaction account information, and communicates with the user's mobile phone over a wireless network to receive and/or transmit information related to the transaction information.

With the payment application of the present invention provided to the mobile phone, the phone may record information unique to any particular transaction made using the payment application. Each such transaction may be assigned a unique identifier by the payment application, and this unique identifier may be stored in the memory of the phone. Further, the unique identifier may be sent from the phone to the merchant's reader along with the user's financial transaction account information, and the merchant's reader may send the unique identifier to the provider. The provider may also send the unique identifier to the mobile phone. The unique identifier may include the time of the transaction.

Typically, the provider of the financial transaction account receives and stores information from the merchant as to the amount and time of a purchase, as well as the identity of the merchant. The provider can later send an SMS to the mobile phone, either automatically or upon request of the user, and if the user answers the SMS, then an application wirelessly retrieves such stored transaction information and the unique identifier. Alternatively, the SMS can directly contain the stored transaction information and the unique identifier. As another alternative, an SMS or other message can be invisible to the user and can automatically update the records of the payment application without action from the user.

Because the mobile phone described herein has been configured with the payment application of the present invention, the phone is able to reconcile the unique identifier with the transaction information stored by American Express Company, and all of the combined information can be displayed on a screen of the phone. In this way, the mobile phone user can see detailed information pertaining to his or her purchases without having to wait for a conventional statement, such as a monthly statement regarding the financial transaction account. Furthermore, the combined information of the unique identifier and the transaction information stored by the provider is more complete and detailed than the provider-stored transaction information alone. Thus, the payment application makes the mobile phone more useful as a financial transaction instrument as compared to a traditional instrument such as a credit card.

Authorization

Because of the abilities of a mobile phone, authorization of the transaction by the provider of the financial transaction account (American Express Company) may proceed and be communicated from the provider to the merchant in ways other than those that apply to conventional credit cards.

Specifically, the mobile phone or other mobile device provides wireless communication, a processor, and a memory not available in conventional payment devices. This allows for unconventional settlement methods for financial transactions that are faster, and thus more useful, than conventional methods.

Particularly, in the case of transactions that require speed, such as the purchase of a mass transit fare, the requirement for contemporaneous authorization by the provider can be eliminated through use of the mobile phone as a fare card in a transit system having RFID card readers. In this instance, the transactions occur offline, and the merchant updates the provider of the financial transaction account later. The payment application on the mobile phone can be set to be deleted or inactivated after a number of offline transactions. The number of offline transactions is stored in the phone, and after the maximum has been reached, then the payment application must be reactivated by contacting the provider. The payment application can be set so that the phone displays a reminder to the user that the maximum number is being approached. Thus, the phone may be enabled for 8 offline transactions (that is, fares), but at transaction 8 (or at some smaller number prior to expiration of authorization), the user is required to reauthorize transactions. In a situation where the fare card reader may not be able to communicate with the provider, the invention provides that financial information can be wirelessly reconciled between the mobile phone and the provider.

Options at the Provider's Website

At the screen shown in 301 in FIG. 3, the user can also select "Amex" in order to access a website of American Express Company at which the user can access financial transaction account information. If "Amex" (or another option) is selected, the user is asked to confirm the selection. For example, as shown in screenshot 302, the screen of the mobile phone can display the message "Do you want to go to web address: http://www.amexmobile.com." If the user selects "No," then the phone goes back to the screen shown in 301. If the user selects "Yes," then the mobile phone accesses the website, and the screen displays an image such as that shown in 303. At the American Express website, additional account information can be viewed.

At the screen shown in 303, the user can select "Exit" to return to the screen shown in 301. The user can also select "Options" to, for example, modify a User ID, set a password for proceeding further in the website, and/or to set security features associated with these actions. If the user enters the correct User ID associated with the user's financial transaction account at the screen shown in 303, then the screen shown in 304 is displayed. The screen 304 offers a "Back" selection for returning to the screen shown in 303. It also provides "Log," "Balance," and "Voucher" selections, each of which leads to another screen as shown in FIG. 4.

Figure 4:
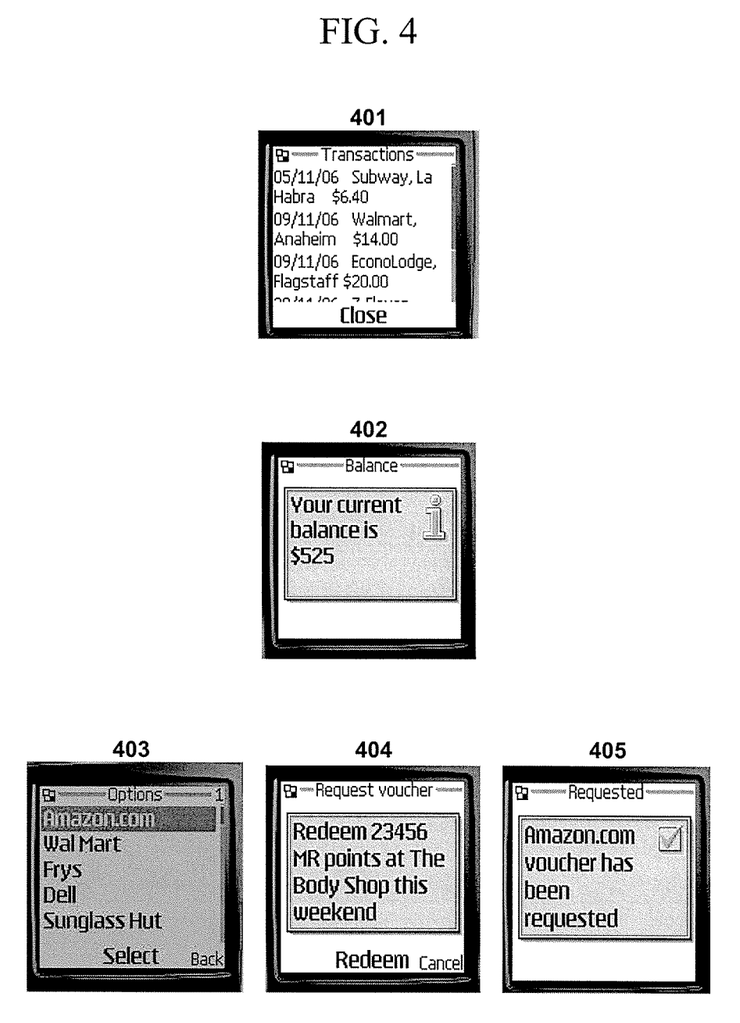
FIG. 4 shows screenshots from a mobile phone showing transaction log information, financial transaction account balance information, and voucher information.

If "Log" is selected, then a transaction log such as that appearing in screenshot 401 of FIG. 4 is retrieved from a web-hosting environment at the provider's side and displayed on the mobile phone. The transaction log in this example lists the dates of transactions, the merchant involved, and the amount of the transaction. The user can scroll through the transaction log and select "Close" to return to the screen shown in 304 of FIG. 3.

If "Balance" is selected on the screen shown in 304 of FIG. 3, then a balance report such as that appearing in screenshot 402 of FIG. 4 is retrieved from a web-hosting environment at the provider's side and displayed on the mobile phone. The balance report in this example states the current balance of the user's financial transaction account, but it could provide additional information such as the balance at different times in the past. The user can scroll through the balance report if necessary and can exit the report to return to the screen shown in 304 of FIG. 3.

If "Voucher" is selected on the screen shown in 304 of FIG. 3, then a voucher list such as that appearing in screenshot 403 of FIG. 4 is retrieved from a web-hosting environment at the provider's side and displayed on the mobile phone. The voucher list in this example identifies several merchants offering vouchers (such as coupons) to the user. The user can scroll through the voucher or select "Back" to return to the screen shown in 304 of FIG. 3. If the user selects one of the listed merchants, for example, "Amazon.com" on the screen shown in 403, then voucher information is retrieved from a web-hosting environment at the provider's side. The screen shown in 404 illustrates what is displayed if the user selects "The Body Shop" from a list of merchants offering vouchers. In this example, the screen 404 displays a message stating that points can be redeemed at The Body Shop. The user can refuse the voucher offer by selecting "Cancel," or accept the offer by selecting "Redeem." The screen shown in 405 illustrates a confirmation to the user that a voucher from Amazon.com (in this case) has been requested. Thereafter, if the user uses the mobile phone to access the Amazon.com website to make a purchase, the voucher information can be transmitted wirelessly to the website.

More preferably, if points are redeemed, merchant information can be sent to the mobile phone such that the mobile phone can be used as a coupon. Thus, in lieu of or in addition to the user's financial transaction account information being accessed to make a purchase, the coupon information can be accessed.

Alternative embodiments can employ, in lieu of point redemption, the sending of an SMS with coupon information. The SMS can be sent to the user's mobile phone when the user tries to make a purchase at a merchant's store. This could be achieved with the incorporation of Global Positioning System (GPS) tracking or a local tracker in the merchant's store that detects that the user is in or near the store. A system that incorporates the local tracker could make use of Near Field Communication (NFC) technology.

While an embodiment of the present invention has been described above, it should be understood that it has been presented by way of example, and not by way of limitation. It will be apparent to persons skilled in the relevant art(s) that various changes in form and detail can be made therein without departing from the spirit and scope of the present invention, which should not be limited to the above-described exemplary embodiment, but should be defined only in accordance with the following claims and their equivalents.

Further, the purpose of the Abstract is to enable the U.S. Patent and Trademark Office and the general public, who may not be familiar with patent or legal terms, to quickly determine the nature and essence of the technical disclosure of the application. The Abstract is not intended to limit the scope of the present invention in any way. It is also to be understood that the steps and processes recited in the claims need not be performed in the order presented.

What is claimed is:

1. A computer-implemented method of operating a mobile phone as a financial transaction instrument to complete a purchase, wherein the mobile phone has financial transaction account information of a user and an application for operating the mobile phone as a financial transaction instrument, the method comprising:
    receiving at a provider computer, from a merchant, (a) the financial transaction account information of the user transmitted directly from the mobile phone to a financial transaction instrument reader of the merchant in response to the user's mobile phone being in proximity thereto, and (b) transaction informaticm of a financial transaction between the user and the merchant;
    processing, by the provider computer, the transaction information and the financial transaction account information;
    authorizing, by the provider computer, the transaction between the merchant and user without contacting the mobile phone;
    communicating, in response to the authorizing and by the provider computer, from the provider computer to the mobile phone over a wireless network, a record of the purchase;
    providing, by the provider computer and to the mobile phone, the application for operating the mobile phone as a financial transaction instrument,
    wherein the application comprises program code for defining a maximum number of transactions that can be completed using the application without further authorization from the user, wherein the application comprises program code for tracking the number of transactions completed using the application since the last authorization from the user,
    wherein in response to the number of transactions completed using the application since the last authorization from the user being a user selectable number less than the maximum number of transactions, prompting the user to provide a PIN for access, wherein in response to the number of transactions approaching the number calling for the user to provide the PIN, the user is prompted via the mobile phone with a first warning indicating that a request to provide the PIN will be requested in a subsequent transaction,
    wherein in response to the number of transactions completed using the application since the last authorization from the user being equal to the maximum number of transactions that can be completed using the application without further authorization from the user, denying the purchase, wherein in response to the number of transactions completed using the application since the last authorization from the user approaching a number equal to the maximum number of transactions that can be completed using the application without further authorization from the user, prompting the user via the mobile phone with a second warning indicating that the maximum number of transactions that can be completed using the application without further authorization from the user is approaching, and
    wherein, in response to determining that the maximum number of transactions has been exceeded, the application disables the application to prevent financial transaction account information from being transmitted.

2. The method of claim 1, wherein the application comprises program code for prompting the user to provide further authorization when the number of transactions completed using the application since the last authorization from the user equals a number less than the maximum number of transactions that can he completed using the application without further authorization from the user.

3. The method of claim 1, wherein the communicating with the user's mobile phone over the wireless network comprises transmitting a unique identifier of the financial transaction.

4. A system for operating a mobile phone as a financial transaction instrument to complete a purchase, wherein the mobile phone has financial transaction account information of a user and an application for operating the mobile phone as a financial transaction instrument, the system comprising:
    a network interface communicating with a memory;
    the memory communicating with a processor for enabling transactions; and
    the processor, when executing a computer program, performs operations comprising:
        receiving, by the processor and from a merchant, (a) the financial transaction account information of the user transmitted directly from the mobile phone to a financial transaction instrument reader of the merchant in response to the mobile phone being in proximity thereto, and (b) transaction information of a financial transaction between the user and the merchant,
        processing, by the processor, the transaction information and the financial transaction account information,
        authorizing, by the processor, the transaction between the merchant and the user without contacting the mobile phone, in response to the authorizing, communicating, by the processor, to the mobile phone over a wireless network, a record of the purchase;

providing, by the processor, to the mobile phone, the application for operating the mobile phone as a financial transaction instrument, wherein the application comprises program code for defining a maximum number of transactions that can be completed using the application without further authorization from the user, wherein the application comprises program code for tracking the number of transactions completed using the application since the last authorization from the user, wherein in response to the number of transactions completed using the application since the last authorization from the user being a user selectable number less than the maximum number of transactions, prompting the user to provide a PIN for access, wherein in response to the number of transactions approaching the number calling for the user to provide the PIN, the user is prompted via the mobile phone with a first warning indicating that a request to provide the PIN will be requested in a subsequent transaction, wherein in response to the number of transactions completed using the application since the last authorization from the user being equal to the maximum number of transactions that can be completed using the application without further authorization from the user, denying the purchase, wherein in response to the number of transactions completed using the application since the last authorization from the user approaching a number equal to the maximum number of transactions that can be completed using the application without further authorization from the user, prompting the user via the mobile phone with a second warning indicating that the maximum number of transactions that can be completed using the application without further authorization from the user is approaching, and wherein, in response to determining that the maximum number of transactions has been exceeded, the application disables the application to prevent financial transaction account information from being transmitted, 5. The system of claim 4, wherein the operations further comprise, providing from the provider's side to the mobile phone, the application for operating the mobile phone as a financial transaction instrument.

6. The system of claim 5, wherein access to the application requires input of a correct personal identification number in order to enable the application to transmit financial transaction account information to the financial transaction instrument reader.

7. The system of claim 4, wherein the one or more processors is configured to transmit a unique identifier of the financial transaction to the mobile phone over the wireless network.

8. A non-transitory computer program product having computer-executable instructions stored thereon for causing a provider computer to receive information from a mobile phone and/or transmit information to the mobile phone, the computer-executable instructions, if executed by the provider computer, cause the provider computer to perform operations comprising:

receiving at the provider computer, from a merchant, (a) financial transaction account information of the user transmitted directly from the mobile phone to a financial transaction instrument reader of the merchant in response to the mobile phone being in proximity thereto, and (b) transaction information of a financial transaction between the user and the merchant, wherein the mobile phone is operable as a financial transaction instrument to complete a purchase, and wherein the mobile phone has financial transaction account information of a user and an application for operating the mobile phone as a financial transaction instrument;

processing, by the provider computer, the transaction information and the financial transaction account information;

authorizing, at the provider computer, the transaction without contacting user's mobile phone;

conununicating after authorization, from the provider computer to the mobile phone over a wireless network, a record of the purchase;

providing, by the provider computer and to the mobile phone, the application for operating the mobile phone as a financial transaction instrument, wherein the application comprises program code for defining a maximum number of transactions that can be completed using the application without further authorization from the user, wherein the application comprises program code for tracking the number of transactions completed using the application since the last authorization from the user, wherein in response to the number of transactions completed using the application since the last authorization from the user being a user selectable number less than the maximum number of transactions, prompting the user to provide a PIN for access, wherein in response to the number of transactions approaching the number calling for the user to provide the PIN, the user is prompted via the mobile phone with a first warning indicating that a request to provide the PIN will be requested in a subsequent transaction, wherein in response to the number of transactions completed using the application since the last authorization from the user being equal to the maximum number of transactions that can be completed using the application without further authorization from the user, denying the purchase, wherein in response to the number of transactions completed using the application since the last authorization from the user approaching a number equal to the maximum number of transactions that can be completed using the application without further authorization from the user, prompting the user via the mobile phone with a second warning indicating that the maximum number of transactions that can be completed using the application without further authorization from the user is approaching, and wherein, in response to determining that the maximum number of transactions has been exceeded, the application disables the application to prevent financial transaction account information from being transmitted.

9. The computer program product of claim 8, wherein access to the application requires input of a correct personal identification number in order to enable the application to transmit financial transaction account information to the financial transaction instrument reader.

10. The computer program product of claim 8, wherein the communicating comprises causing the computer to transmit a unique identifier of the financial transaction to the user's mobile phone over the wireless network.

11. The method of claim 1, further comprising:
    detecting, using a global positioning system (OPS), whether the mobile phone is in the vicinity of the merchant;
    providing merchant information including information regarding an available voucher to the mobile phone over a wireless network, in response to the detecting indicating that the mobile phone is in the vicinity of the merchant; and
    applying the available voucher at the time of purchase in response to the mobile phone is being used as the financial transaction instrument.

12. The method of claim 11, wherein the merchant information is provided to the mobile phone in an short message service (SMS) message.

\* \* \* \* \*

UNITED STATES PATENT AND TRADEMARK OFFICE
CERTIFICATE OF CORRECTION

PATENT NO. : 8,543,496 B2  Page 1 of 1
APPLICATION NO. : 11/741268
DATED : September 24, 2013
INVENTOR(S) : Blayn W. Beenau et al.

It is certified that error appears in the above-identified patent and that said Letters Patent is hereby corrected as shown below:

In the claims

In column 13, line 49 (claim 1), please delete "informaticm" and insert -- information --.

In column 16, line 18 (claim 8), please delete "conununicating" and insert -- communicating --.

In column 17, line 4 (claim 11), please delete "(OPS)" and insert -- (GPS) --.

In column 17, line 16 (claim 12), please delete "an short message" and insert -- a short message --.

Signed and Sealed this
Fifteenth Day of March, 2016

Michelle K. Lee
*Director of the United States Patent and Trademark Office*